(12) United States Patent
Beale et al.

(10) Patent No.: US 11,743,950 B2
(45) Date of Patent: *Aug. 29, 2023

(54) METHODS, INFRASTRUCTURE EQUIPMENT AND COMMUNICATIONS DEVICE

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,728

(22) Filed: May 16, 2022

(65) Prior Publication Data

US 2022/0272766 A1  Aug. 25, 2022

Related U.S. Application Data

(63) Continuation of application No. 17/043,666, filed as application No. PCT/EP2019/058076 on Mar. 29, 2019, now Pat. No. 11,337,256.

(30) Foreign Application Priority Data

Apr. 6, 2018 (EP) .................................... 18166205

(51) Int. Cl.
*H04W 74/08* (2009.01)
*H04B 1/713* (2011.01)
(Continued)

(52) U.S. Cl.
CPC ........ *H04W 74/0833* (2013.01); *H04B 1/713* (2013.01); *H04W 72/0453* (2013.01); *H04W 74/006* (2013.01); *H04W 74/0866* (2013.01)

(58) Field of Classification Search
CPC ......... H04W 74/0833; H04W 72/0453; H04W 74/006; H04W 74/0866; H04W 74/04;
(Continued)

(56) References Cited

U.S. PATENT DOCUMENTS

| 2013/0077582 A1* | 3/2013 | Kim ..................... H04W 74/002 370/329 |
| 2014/0010183 A1 | 1/2014 | McNamara et al. |

(Continued)

FOREIGN PATENT DOCUMENTS

EP    2903349 B1 *  4/2017  ............ H04W 48/10

OTHER PUBLICATIONS

International Search Report and Written Opinion dated May 13, 2019 for PCT/EP2019/058076 filed on Mar. 29, 2019, 11 pages.
(Continued)

*Primary Examiner* — Thai Nguyen
(74) *Attorney, Agent, or Firm* — Xsensus LLP

(57) ABSTRACT

A method of operating an infrastructure equipment in a wireless communications system to support first and second random access procedures is provided, wherein a number of subcarriers used for an uplink message of the second random access procedure is smaller than a number of subcarriers used for a corresponding uplink message of the first random access procedure. The method comprises transmitting, to at least one communications device, a scheduling message comprising an indication of a first set of radio resources comprising a plurality of subcarriers to be used for a random access procedure message for the first random access procedure, determining a second set of radio resources to be used for a random access procedure message for the second random access procedure, and monitoring for a random access procedure message from the at least one communications device on the second set of radio resources.

19 Claims, 12 Drawing Sheets

(51) Int. Cl.
*H04W 72/0453* (2023.01)
*H04W 74/00* (2009.01)

(58) Field of Classification Search
CPC .............. H04W 74/008; H04W 74/02; H04W 72/0406; H04B 1/713
See application file for complete search history.

(56) References Cited

U.S. PATENT DOCUMENTS

| | | | |
|---|---|---|---|
| 2017/0311326 A1 | 10/2017 | Wong et al. | |
| 2018/0097672 A1 | 4/2018 | Jung et al. | |
| 2018/0310344 A1 | 10/2018 | Zhou et al. | |
| 2019/0132882 A1* | 5/2019 | Li | H04W 74/0816 |

OTHER PUBLICATIONS

2010—LTE for UMTS OFDMA and SC-FDMA Based Radio Access.

3GPP TSG RAN WG1 Meeting #90 Prague, Czech Republic, Oct. 9-13, 2017 Title: Sub-PRB Design Analysis.

3GPP TSG-RAN WG1 Meeting #85 Nanjong, China May 22-26, 2016 Title: RAN1 Agreements for REL-13 NB-IOT R1-165977.

ETSI TS 136 321 V14.2.1 (May 2017) Evolved Universal Terrestrial Radio Access (E-UTRA); Medium (MAC) Protocol Specification Release 14.

New WID on Even further enhanced MTC for LTE 3GPP TSG RAN Meeting #75 RP-170732 Dubrovnik, Croatia, Mar. 6-9, 2017.

New WID on Further NB-IoT enhancements #3GPP TSG RAN Meeting #75 RP-170852 Dubrovnik, Croatia, Mar. 6-9, 2017.

Revised work item proposal: Enhancements of NB-IoT 3GPP TSG RAN Meeting #73 RP-161901 New Orieans, USA, Sep. 19-22, 2016.

RP-161464 Revised WID for Further Enhanced Mtc New Orleans USA, Sep. 19-22, 2016.

Wiley LTE UMTS of DMA and SC-FDMA Based Radio Access 2009 HOLMA and TOSCADA p. 25.

* cited by examiner

METHODS, INFRASTRUCTURE EQUIPMENT AND COMMUNICATIONS DEVICE

CROSS-REFERENCE TO RELATED APPLICATIONS

The present application is a continuation of U.S. application Ser. No. 17/043,666, filed Sep. 30, 2020, which is based on PCT filing PCT/EP2019/058076, filed Mar. 29, 2019, which claims priority to EP 18166205.7, filed Apr. 6, 2018, the entire contents of each are incorporated herein by reference.

BACKGROUND

Field of Disclosure

The present disclosure relates to methods and various telecommunications apparatus for the allocation of subcarriers for communications between infrastructure equipment and communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things" or IoT for short. The Third Generation Partnership Project (3GPP) has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

Embodiments of the present technique can provide a method of operating an infrastructure equipment in a wireless communications system to support first and second random access procedures, wherein a number of subcarriers used for an uplink message of the second random access procedure is smaller than a number of subcarriers used for a corresponding uplink message of the first random access procedure. The method comprises transmitting, to at least one communications device, a scheduling message comprising an indication of a first set of radio resources comprising a plurality of subcarriers to be used for a random access procedure message for the first random access procedure, determining a second set of radio resources to be used for a random access procedure message for the second random access procedure, wherein the second set of radio resources comprises one or more subcarriers which are indicated by one or more characteristics of the scheduling message, and monitoring for a random access procedure message from the at least one communications device on the second set of radio resources.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
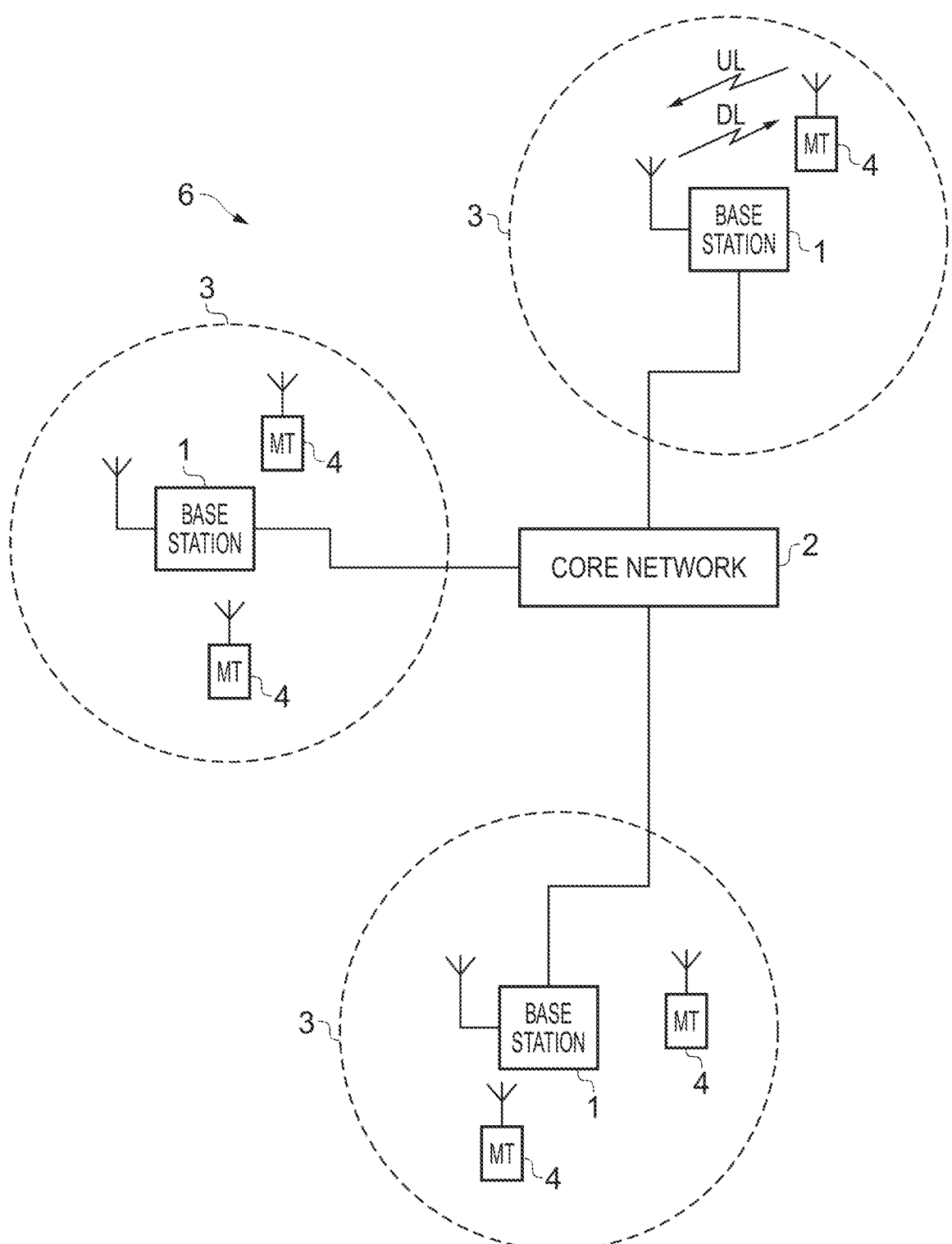
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example. Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
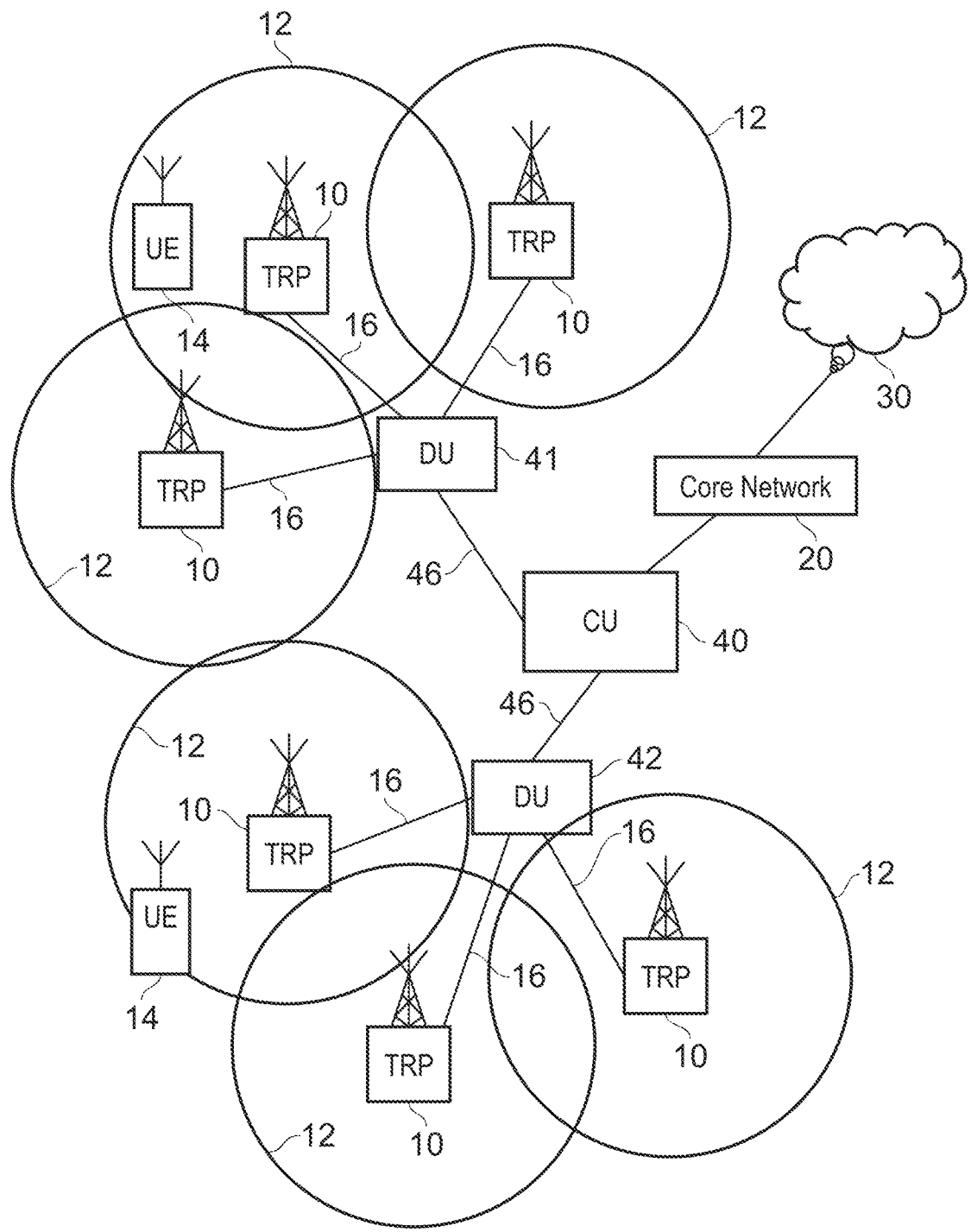
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a line 12. As such wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Thus certain embodiments of the disclosure as discussed herein may be implemented in wireless telecommunication systems/networks according to various different architectures, such as the example architectures shown in FIG. 1 and FIG. 2. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 in a new RAT architecture of the kind discussed above in relation to FIG. 2.

Random Access (RACH) Procedure

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection, which can be particularly helpful for infrequent and short messages type of traffic.

Figure 3:
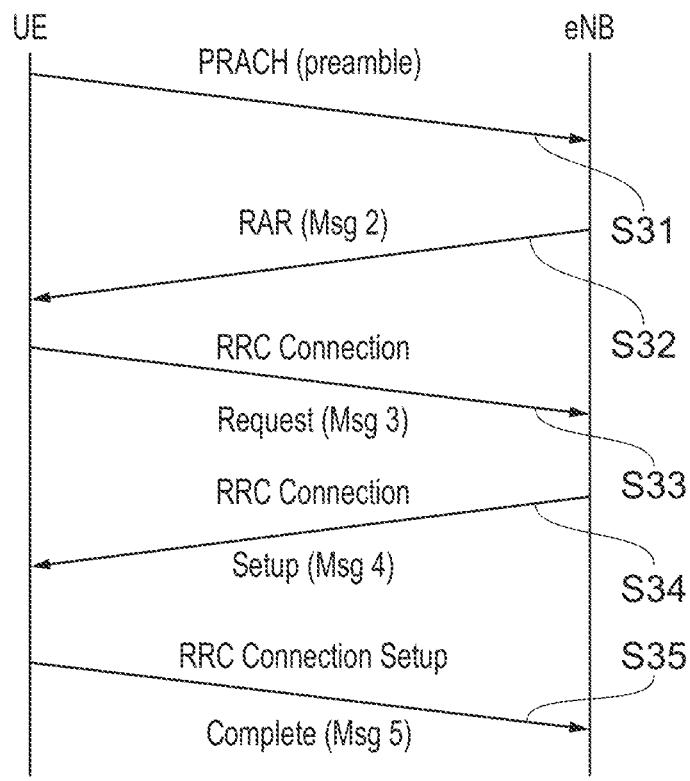
FIG. 3 schematically represents an example random access procedure for use by different types of terminal device.

FIG. 3 is a ladder diagram that schematically shows message exchange between a UE and an eNodeB in a typical random access procedure to establish an RRC connection, in this example in an LTE-based network. The UE starts the process in step S31 by transmitting a random access request on a physical random access channel (PRACH in an LTE context), i.e. a random access preamble (RACH preamble), to the eNodeB. In step S32, when the eNodeB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S31, and the RAR will indicate which preamble the eNodeB has detected and is responding to. It may be noted it is possible that multiple UEs may transmit a random access request using the same PRACH preamble and in the same time and frequency resources. The RAR of step S32 also contains an uplink grant for the preamble the network is responding to so that the UE that transmitted the preamble may use this uplink grant to transmit an RRC Connection Request message, also known as Message 3 to the eNodeB, in step S33. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNodeB will respond to Message 3, in step S34, with Message 4 which carries an RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S35 containing an RRC Connection Setup Complete message.

A previously proposed approach for EDT in uplink is for additional data to be transmitted in association with the RRC connection request message, in Message 3 (step S33 in FIG. 3). For the legacy approach to random access, Message 3 carries only control messages and therefore has a limited Transport Block Size (TBS). In order for Message 3 to carry more useful amounts of data, the 3GPP group has agreed to allow for an increase in the TBS for Message 3 to 1000 bits. However, it has also been agreed that an eNodeB need not fulfil an EDT request by allocating resources for a TBS for Message 3 up to 1000 bits, but the eNodeB can instead schedule a smaller TBS as for a legacy Message 3, for example having regard to overall resource availability. In this case the UE may, for example, need to follow the legacy approach of establishing an RRC connection to communicate the data rather than using EDT.

In order for the eNodeB to identify whether a UE has EDT capability/is requesting an allocation of radio resources for EDT in Message 3, it has been proposed that a set of available PRACH preambles be partitioned such that a sub-group of PRACH preambles is used by a UE supporting EDT to indicate to the eNodeB its capability and to request EDT over Message 3

Sub-PRB PUSCH

Figure 4:
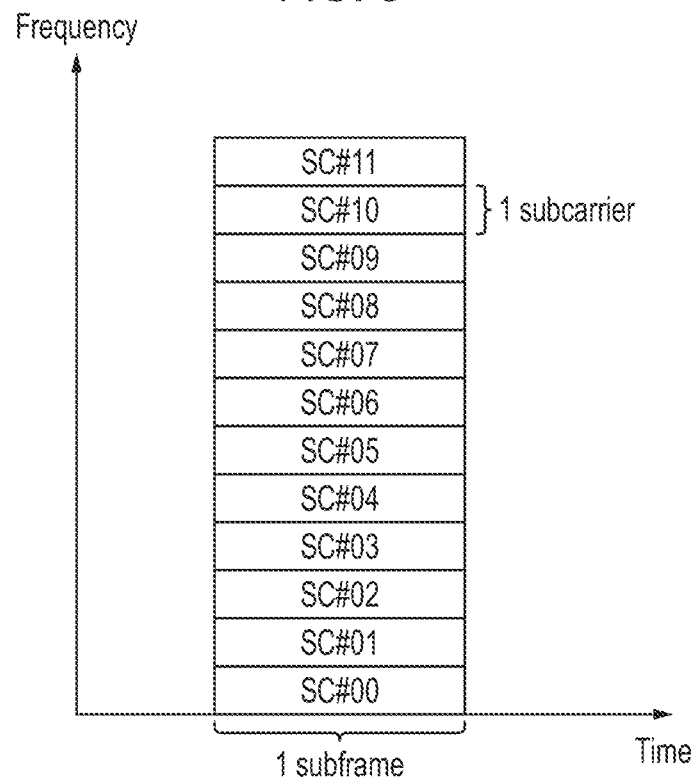
FIG. 4 shows an example of a physical uplink shared channel (PUSCH) transmission using a single physical resource block (PRB) pair.

In the legacy eMTC (Rel-13 and Rel-14), the smallest frequency resource unit that the physical uplink shared channel (PUSCH) can occupy is one resource block (RB), or a physical resource block (PRB) pair, i.e. 12 subcarriers×1 subframe as shown in FIG. 4, where the subcarriers are indexed from 00 to 11. This is termed as PRB level transmission, even though PRB refers to 12 subcarriers×1 slot (where 1 subframe=2 slots) —hence the smallest frequency resource the PUSCH occupies is a PRB pair.

One of the objectives of Rel-15 efeMTC is to improve the spectral efficiency in the uplink, and the agreed method is to use sub-PRB transmission for PUSCH. That is, in the frequency domain, the resources occupied by a PUSCH transmission are less than a single PRB (i.e. fewer than the 12 subcarriers as shown in FIG. 4 are used). The agreed number of subcarriers for efeMTC sub-PRB PUSCH transmissions is any of 6 subcarriers, 3 subcarriers and "2-of-3" subcarriers (where 3 subcarriers are allocated for the UE, but only 2 are actually used by the UE). In other words, the eNodeB can choose to schedule to the UE either 6 subcarriers, 3 subcarriers or "2-of-3" subcarriers. Those skilled in the art would appreciate that 2-of-3 subcarriers is essentially the same as 2 subcarrier transmission, but due to non-technical issues, 3 subcarriers are used by the eNodeB. The benefits of sub-PRB include:

Higher power spectral density is achieved on the PUSCH transmission; that is, the UE transmission power is concentrated on a fewer number of subcarriers; and Improved capacity is achieved at the network since more UEs can be multiplexed in the same frequency resources.

Figure 5:
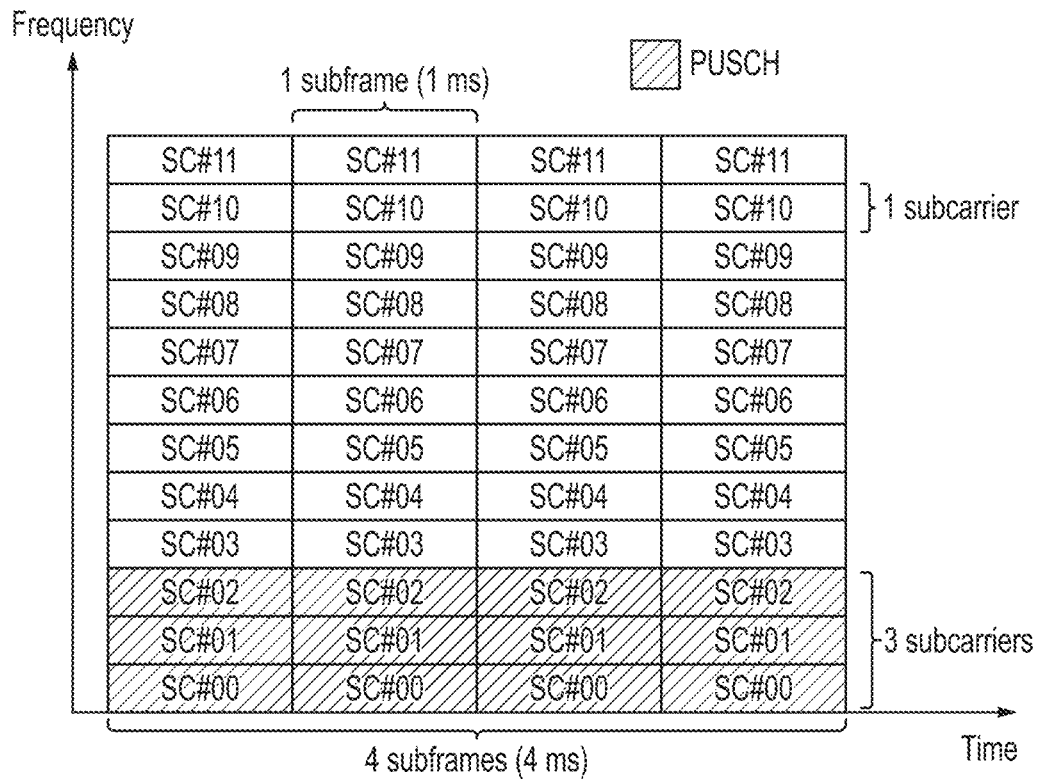
FIG. 5 shows an example of a sub-PRB PUSCH transmission.

Since only a fraction of an RB (or PRB pair) is used for PUSCH, the resources (i.e. Resource Elements (REs)) available within 1 subframe would be reduced (e.g. by half in a 6 subcarrier transmission, a quarter in a 3 subcarrier transmission, etc.) and therefore there is a reduction in the Transport Block Size (TBS) that can be supported with a meaningful code rate. Recognising this, the concept of a Resource Unit (RU), which was introduced for Rel-13 NB-IoT, is also employed for sub-PRB eMTC. The RU is the granularity for sub-PRB PUSCH transmissions, where the reduced number of REs in the frequency domain is offset by increasing the time duration of the granularity, such that the total number of REs is the same as (or similar) to that in one PRB pair. For example, for a 3 subcarrier transmission occupying subcarriers $\{0, 1, 2\}$ as shown in FIG. 5, the RU would consist of 3 subcarriers×4 subframes thereby giving the number of REs equivalent to that of a PRB pair.

Figure 6:
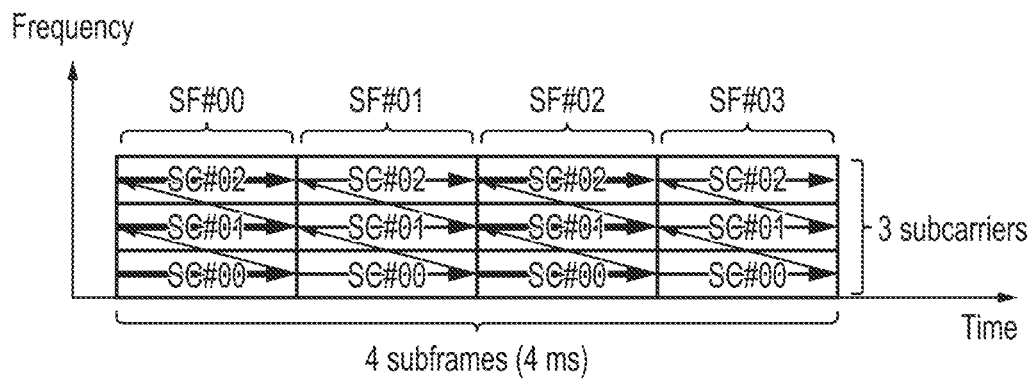
FIG. 6 shows an example of how resource elements (REs) may be mapped to a resource unit (RU) for a sub-PRB transmission formed of subcarriers from each of a plurality of subframes.

It has also been agreed that the symbols are mapped to the REs of an RU in a subframe by subframe basis, as shown in FIG. 6. Here we use an RU of 3 subcarriers×4 subframes (ms), and here the modulated symbols are firstly mapped onto subframe SF #00 starting with subcarrier SC #00, working up to SC #02. Mapping then proceeds to subframe SF #01 and the process is repeated until SF #03. This method of RE mapping has the benefit of maintaining the eNodeB process of managing an uplink transmission on a subframe (i.e. 1 ms) basis (i.e. the eNodeB processing for the RU-based mapping can reuse the processing used for legacy transmissions).

For PRB level transmission, a Transport Block (TB) can occupy more than one PRB. Similarly, for sub-PRB transmission, a TB can occupy more than one RU, and the number of RUs is denoted as $I_{RU}$. Hence, a single repetition of a TB would occupy a duration that equals the RU length in time ($T_{RU}$) multiplied by the number of RUs ($I_{RU}$), i.e. a duration of ($T_{RU} \times I_{RU}$).

RACH Message 3 Using Sub-PRB Transmission

One issue that requires consideration is whether Message 3 of the RACH process supports sub-PRB transmission. It should be noted that prior to the transmission of Message 3, the only uplink information that the UE can relay to the eNodeB is the PRACH preamble. That is in order for the eNodeB to differentiate a sub-PRB capable UE from one that is not capable of sub-PRB, the PRACH preamble needs to be partitioned such that a group of preambles are reserved for sub-PRB capable UEs. However, it was already agreed in 3GPP that Early Data Transmission (EDT) over Message 3 is indicated using PRACH preamble and hence further partition of the PRACH preamble/resources also for sub-PRB would reduce the PRACH resources for legacy UEs. It should also be appreciated that the PRACH preamble needs to be partitioned into 4 groups to indicate the support of EDT & sub-PRB, EDT without sub-PRB, sub-PRB without EDT and legacy.

One proposal is for the eNodeB to transmit two RARs—one for the legacy UE, and another for the sub-PRB capable UE. The eNodeB would then perform blind decoding on the uplink resources that it scheduled for a potential legacy UE and a potential sub-PRB UE. This proposal was argued to waste resources; firstly for transmitting two RARs, and secondly for reserving two sets of PUSCH resources (for legacy and for sub-PRB UEs).

Another proposal in [6] is to use dual implicit scheduling. Here, the uplink grant in the RAR is maintained and only 1 RAR is transmitted as per the legacy procedure. The network would indicate support for sub-PRB PUSCH and, for a UE that is capable of sub-PRB PUSCH transmission, it would interpret the Repetition and the Resource Allocation field in the uplink grant differently to how a legacy UE would interpret it. If the Resource Allocation indicates only 1 PRB is scheduled and the Repetition >1, the sub-PRB capable UE would interpret this as a sub-PRB transmission. The number of subcarriers used is dependent upon the indicated Repetition and is selected to be multiples of the RU length in time.

An example is shown in Table 1 below, which is reproduced from [6], for the 3 bit Repetition field of the uplink grant for CE Mode B (UE that used PRACH resource corresponding to Coverage Enhancement level 2 and 3), where the max repetition is 128. Here the eNodeB schedules only 1 PRB and the UE would then read the indicated repetition to determine the number of subcarriers used. For example if the repetition is 8, that means the UE (i.e. sub-PRB-capable UE) would transmit using 3 subcarriers with a repetition of 2 (the legacy UE would transmit using 12 subcarriers with a repetition of 8). It should be appreciated that the total transmission time, which is calculated as the repetition (R)×RU length in time ($T_{RU}$)×Number of RU ($I_{RU}$) equals to the length of the original indicated repetition transmission length. This is beneficial for eNodeB scheduling since the same time resource is reserved whether the UE is sub-PRB capable or a legacy UE.

TABLE 1

Dual implicit scheduling interpretation for sub-PRB capable UE

| | | Sub-PRB Interpretation | | | |
| --- | --- | --- | --- | --- | --- |
| Indicated Repetition | Number of subcarriers | Repetitions, R | $T_{RU}$ | $I_{RU}$ | $R \times T_{RU} \times I_{RU}$ |
| 1 | 12 subcarriers (1 PRB) | 1 | N/A | N/A | 1 ms |
| 2 | 6 subcarriers | 1 | 2 | 1 | 2 ms |
| 4 | 3 subcarriers | 1 | 4 | 1 | 4 ms |
| 8 | 3 subcarriers | 2 | 4 | 1 | 8 ms |
| 16 | 3 subcarriers | 4 | 4 | 1 | 16 ms |
| 32 | 3 subcarriers | 4 | 4 | 2 | 32 ms |
| 64 | 3 subcarriers | 4 | 4 | 4 | 64 ms |
| 128 | 3 subcarriers | 8 | 4 | 4 | 128 ms |

Figure 7:
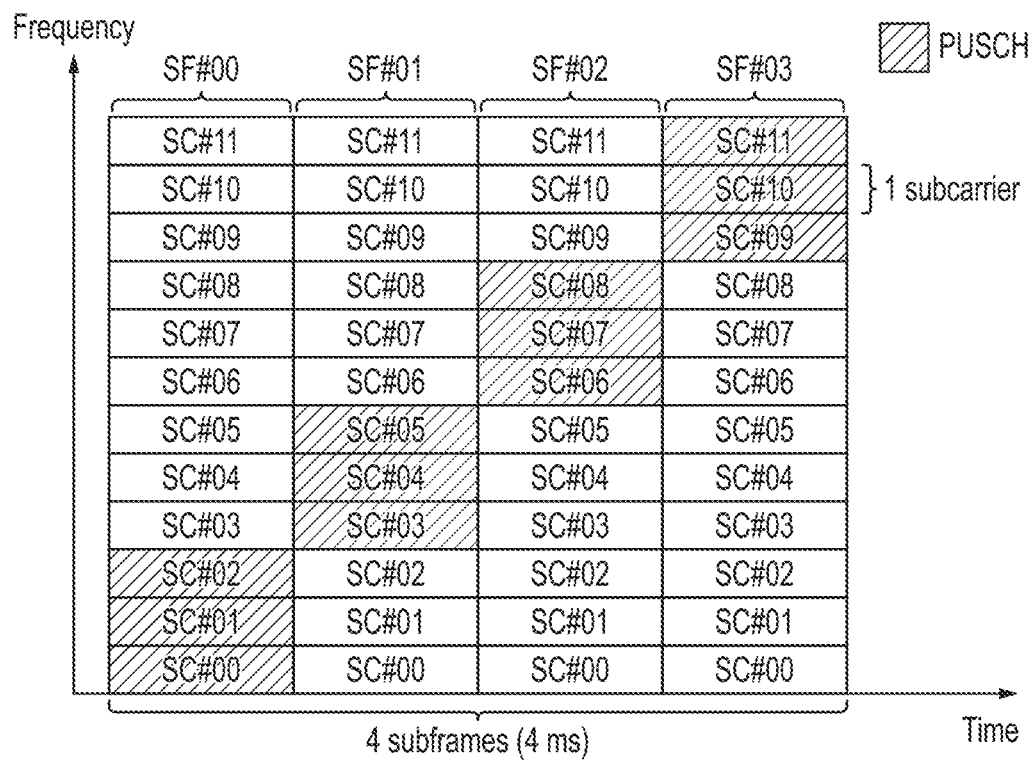
FIG. 7 shows an example of subcarrier hopping within an RU.

Another aspect of dual implicit scheduling is that the transmission of the subframe within an RU performs frequency hopping (or subcarrier hopping) such that each subframe within an RU occupies different subcarriers. This is explained with an example shown in FIG. 7. Here an RU of 3 subcarriers×4 subframes is allocated and instead of occupying the same set of subcarriers, the UE transmits using different sets of subcarriers in different subframes. In this example, in the subframe SF #00 the UE uses subcarriers {00, 01, 02}, in SF #01 subcarriers {03, 04, 05} are used, in SF #02 subcarriers {06, 07, 08} are used and in SF #03 subcarriers {09, 10, 11} are used. The eNodeB would blind decode for a sub-PRB type transmission and a legacy transmission, for example by taking into account which subcarriers and subframes contain PUSCH and which don't.

One problem with the dual implicit scheduling method is that there is no mechanism proposed for the eNodeB to decide on which 3 or 6 subcarriers in a subframe the UE should use. Embodiments of the present disclosure provide solutions to this problem.

Subcarrier Allocation for RACH Message 3 Transmission in eMTC

Certain embodiments of the disclosure propose approaches in which a single scheduling message transmitted by an infrastructure equipment (eNodeB) as part of a random access procedure may be interpreted differently by different types of communications device (UE). For example, the scheduling message may indicate a first set of radio resources comprising a plurality of subcarriers to be used by a legacy UE for a random access procedure message for the first random access procedure. However, a sub-PRB capable UE may be configured to interpret the scheduling message as allocating a second set of radio resources to be used by the sub-PRB capable UE for a random access procedure message for the second random access procedure, wherein the second set of radio resources comprises one or more subcarriers—where this number of subcarriers is smaller than the number of the plurality of subcarriers used by the legacy UE for the random access procedure message for the first random access procedure. Here, while the plurality of subcarriers may number 12 per subframe, the one or more of the plurality of subcarriers which form the second set of radio resources may number, for example, 3 or 6 per subframe. The specific 3 or 6 (for example) subcarriers of the subframe used for the second set of resources are implicitly indicated by one or more characteristics of the scheduling message. This allows the eNodeB to use a single scheduling message to allocate different sets of radio resources for different UEs having different capabilities. The eNodeB is then able to monitor the second set of resources for an RRC connection request (RACH procedure message 3) from sub-PRB capable UEs. Optionally, the eNodeB can monitor both the first set of resources and the second set of resources for RRC connection requests, such that it is able to receive these from both sub-PRB capable UEs and legacy UEs.

Figure 8:
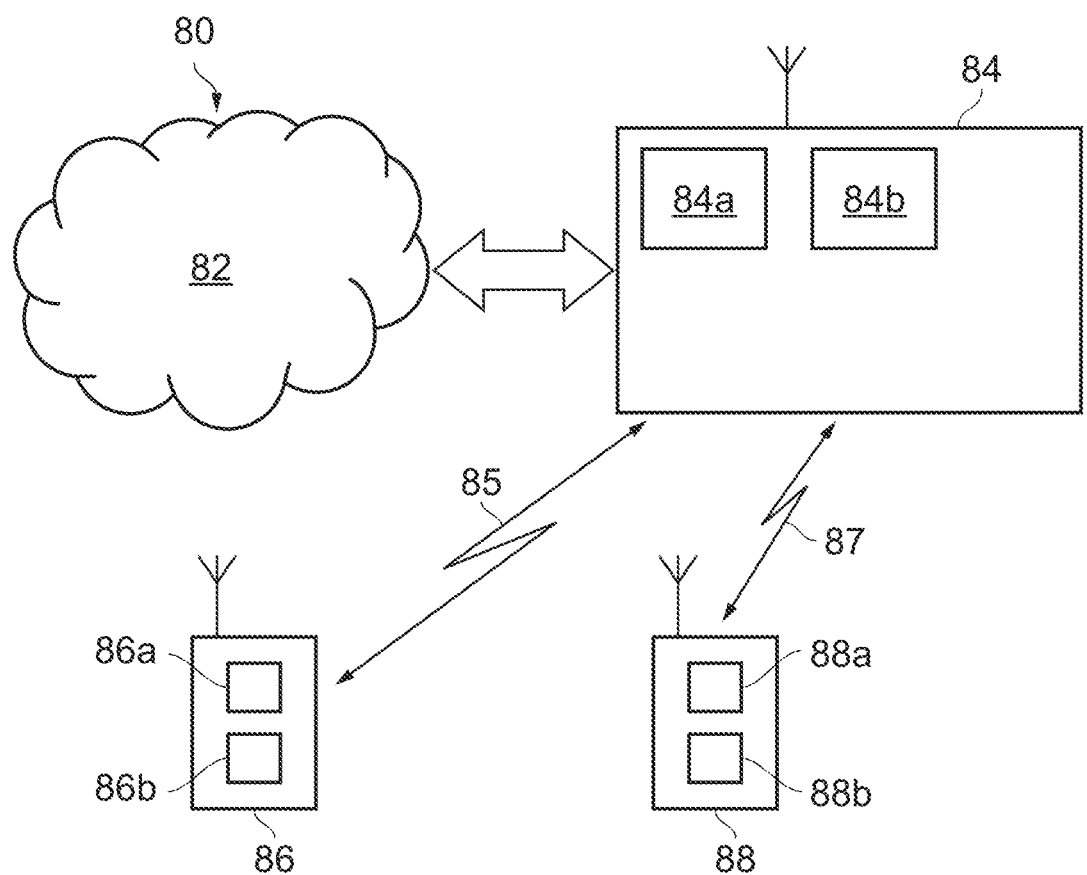
FIG. 8 schematically represents some aspects of a wireless communications system in accordance with embodiments of the present technique.

FIG. 8 schematically shows a wireless communications system 80 according to an embodiment of the present disclosure. The wireless communications system 80 in this example is based broadly around an LTE-type architecture. As such many aspects of the operation of the wireless communications system/network 80 are known and understood and are not described here in detail in the interest of brevity. Operational aspects of the wireless communications system 80 which are not specifically described herein may be implemented in accordance with any known techniques, for example according to the current LTE standards or NR standards.

The wireless communications system 80 comprises a core network part (evolved packet core) 82 coupled to a radio network part. The radio network part comprises a base station (eNodeB) 84 coupled to a plurality of communications devices. In this example, two communications devices are shown, namely a first communications device 86 and a second communications device 88. It will of course be appreciated that in practice the radio network part may comprise a plurality of eNodeBs serving a larger number of communications devices across various communication cells. However, only a single eNodeB and two communications devices are shown in FIG. 8 in the interests of simplicity.

As with a conventional mobile radio network, the communications devices 86, 88 are arranged to communicate data to and from the eNodeB (transceiver station) 84. The eNodeB is in turn communicatively connected to a serving gateway, S-GW, (not shown) in the core network part which is arranged to perform routing and management of mobile communications services to the communications devices in the wireless communications system 80 via the eNodeB 84. In order to maintain mobility management and connectivity, the core network part 82 also includes a mobility management entity (not shown) which manages the enhanced packet service (EPS) connections with the communications devices 86, 88 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 82 to an external packet data network, for example the Internet. As noted above, the operation of the various elements of the communications system 80 shown in FIG. 8 may be broadly conventional apart from where modified to provide functionality in accordance with embodiments of the present disclosure as discussed herein.

In this example, it is assumed the first communications device 86 is a conventional smartphone-type communications device communicating with the eNodeB 84 in a conventional manner (i.e. the first communications device is a legacy communications device that does not support sub-PRB transmission). It will be appreciated the first communications device need not be a smartphone-type communications device and could equally be another type of legacy communications device, including a device that has the capability to support sub-PRB transmission, but is currently not doing so. The conventional/legacy communications device 86 comprises transceiver circuitry 86a (which may also be referred to as a transceiver 1 transceiver unit) for transmission and reception of wireless signals and processor circuitry 86b (which may also be referred to as a processor/processor unit) configured to control the device 86. The processor circuitry 86b may comprise various sub-units/sub-circuits for providing functionality as explained further herein. These sub-units may be implemented as discrete hardware elements or as appropriately configured functions of the processor circuitry. Thus the processor circuitry 86b may comprise circuitry which is suitably configured/programmed to provide the desired functionality using conventional programming/configuration techniques for equipment in wireless communications systems. The transceiver circuitry 86a and the processor circuitry 86b are schematically shown in FIG. 8 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the legacy (non-sub-PRB capable) communications device 86 will in general comprise various other elements associated with its operating functionality.

In this example, it is assumed the second communications device 88 is a machine-type communication (MTC or eMTC or efeMTC) communications device 88 adapted to support sub-PRB transmission (i.e. the second communications device may be referred to as a sub-PRB capable communications device/UE). In this regard, the second communications device 88 may be a reduced capability communications device, for example a communications device able to operate on a restricted bandwidth as compared to conventional communications devices (i.e. what might be referred to as a narrowband device). However, it will be appreciated this represents merely one specific implementation of approaches in accordance with embodiments of the disclosure, and in other cases, the same principles may be applied in respect of communications devices that support sub-PRB transmission but which are not reduced capability communications devices, but may, for example, comprise smartphone communications devices, or indeed any other form of communications device, that may be operating in a wireless communications system. It will be appreciated that a sub-PRB capable communications device may also function as a non-sub-PRB capable/legacy communications device, e.g. when it does not want to use sub-PRB transmission.

The sub-PRB capable communications device 88 comprises transceiver circuitry 88a (which may also be referred to as a transceiver/transceiver unit) for transmission and reception of wireless signals and processor circuitry 88b (which may also be referred to as a processor/processor unit) configured to control the communications device 88. The processor circuitry 88b may comprise various sub-units/sub-circuits for providing desired functionality as explained further herein. These sub-units may be implemented as discrete hardware elements or as appropriately configured functions of the processor circuitry. Thus the processor circuitry 88b may comprise circuitry which is suitably configured/programmed to provide the desired functionality described herein using conventional programming/configuration techniques for equipment in wireless communications systems. The transceiver circuitry 88a and the processor circuitry 88b are schematically shown in FIG. 8 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the communications device 88 will in general comprise various other elements associated with its operating functionality, for example a power source, user interface, and so forth, but these are not shown in FIG. 8 in the interests of simplicity.

The eNodeB 84 comprises transceiver circuitry 84a (which may also be referred to as a transceiver/transceiver unit) for transmission and reception of wireless signals and processor circuitry 84b (which may also be referred to as a processor/processor unit) configured to control the eNodeB 84 to operate in accordance with embodiments of the present disclosure as described herein. The processor circuitry 84b may comprise various sub-units/sub-circuits for providing desired functionality as explained further herein. These sub-units may be implemented as discrete hardware elements or as appropriately configured functions of the processor circuitry. Thus the processor circuitry 84b may comprise circuitry which is suitably configured/programmed to provide the desired functionality described herein using conventional programming/configuration techniques for equipment in wireless communications systems. The transceiver circuitry 84a and the processor circuitry 84b are schematically shown in FIG. 8 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the eNodeB 84 will in general comprise various other elements associated with its operating functionality.

As described above, embodiments of the present technique implicitly indicate the set of the subcarriers within the scheduled PRB when sub-PRB transmission for Message 3 of the RACH procedure is scheduled. Embodiments of the present disclosure can be divided into two broad categories:

The eNodeB is unaware whether the UE transmitting the PRACH is sub-PRB capable or is a legacy UE; and The eNodeB is aware that a UE transmitting a PRACH is sub-PRB capable or is a legacy UE. This can be achieved by partitioning/reserving some PRACH resources such as preambles for use only by sub-PRB capable UEs. It should be appreciated that Early Data Transmission (EDT) over Message 3 uses the PRACH partitioning method to inform the eNodeB of the UE's capability and intention to use EDT, as described above. It has also been previously proposed that an EDT capable UE will also mandatorily support sub-PRB transmission.

In an example arrangement, the sub-PRB transmission is only applicable to a set of predetermined narrowbands in frequency. That is, if any of these predetermined narrowbands (or sub-bands) are scheduled then the UE follows one of the sub-PRB transmission arrangements as described below. In other words, in this example arrangement, the infrastructure equipment only monitors for the random access procedure message from the at least one communications device on the second set of radio resources if the infrastructure equipment has scheduled the at least one communications device to transmit signals to the infrastructure equipment using radio resources within at least one of a set of predetermined frequency sub-bands. The set of predetermined narrowbands can be signalled in the system information blocks (SIBs) or can be specified in the specifications, for example as a function of cell ID and system bandwidth. Hence, only UEs allocated into these predetermined sets of narrowbands are allowed to use sub-PRB transmission for Message 3, even if they would otherwise be capable. It should be noted such an arrangement is applicable to both the sub-PRB-unaware and sub-PRB-aware example RACH processes as described below.

Sub-PRB Unaware RACH

Some embodiments of the present technique can provide example arrangements for cases where the eNodeB does not know whether a received PRACH (preamble) is from a sub-PRB capable UE or a legacy UE. In other words, in these embodiments, the infrastructure equipment is unaware of whether or not the at least one communications device is capable of transmitting the random access procedure message using the second set of radio resources.

Figure 9:
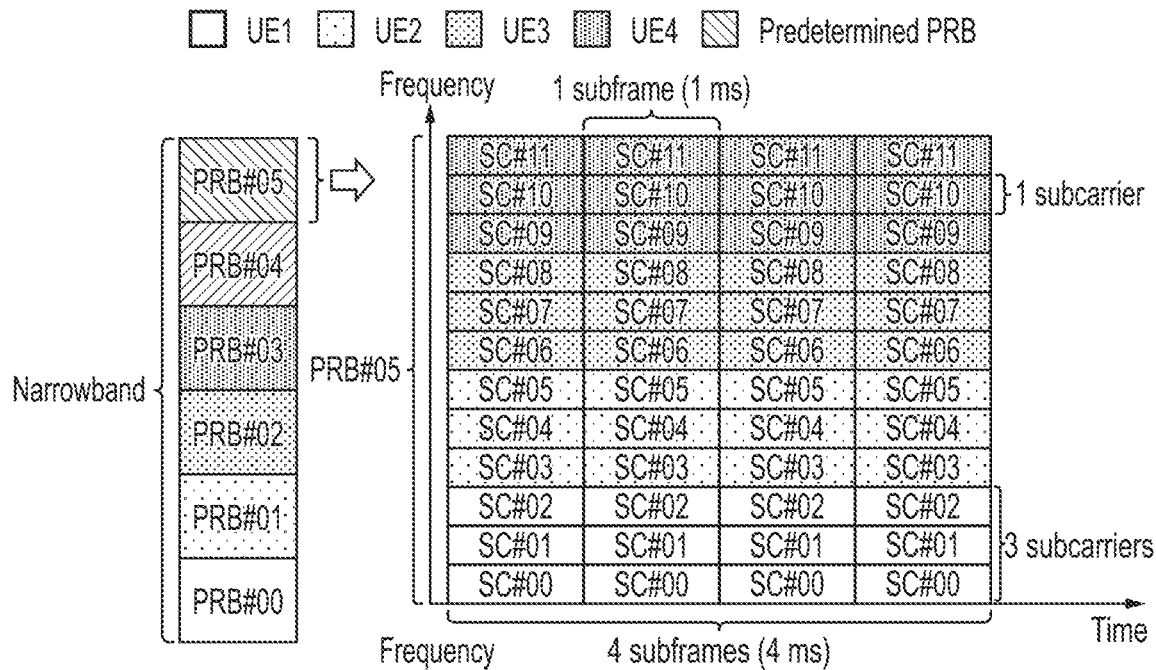
FIG. 9 shows an example of a scheduled PRB indicating a set of subcarriers in a predetermined PRB in accordance with embodiments of the present technique.

In an example arrangement, the scheduled (single) PRB would implicitly indicate the set of subcarriers to be used. In other words, in this example arrangement, the characteristics of the scheduling message which indicates the subcarriers forming the second set of radio resources comprise a mapping between the subcarriers forming the first set of radio resources and the subcarriers forming the second set of radio resources (for example, the mapping links a position/location of the subcarriers of the first set of resources within the narrowband with those subcarriers used for the second set of resources, e.g. within a PRB). The indicated set of subcarriers to be used may be in a predetermined PRB (i.e. the second set of radio resources is selected from a predetermined set of resources). An example is shown in FIG. 9, where the said predetermined PRB is PRB #05 and a one to one mapping of scheduled PRB to set of subcarriers for the 3 subcarriers case is shown such that if a UE e.g. UE1 is scheduled to use PRB #00, it would directly map to subcarriers {SC #00, SC #01, SC #02} in the predetermined PRB #05. Similarly PRB #01 maps to subcarriers {SC #03, SC #04, SC #05} of PRB #05. PRB #02 maps to subcarriers {SC #06, SC #07, SC #08} of PRB #05 and PRB #03 maps to subcarriers {SC #09, SC #10, SC #11} of PRB #05. A legacy UE receiving the UL grant would directly use the scheduled PRB. For example if UE1 is a legacy UE and UE2 is sub-PRB capable, an eNodeB (who is not aware whether these UEs are sub-PRB capable or legacy) can schedule UE1 to use PRB #00 and UE2 to use PRB #01. Here UE1 would use the entire (all subcarriers) in PR #00 whilst UE2 will use subcarriers {SC #03, SC #04, SC #05} in PRB #05. The eNodeB can then perform blind decodes on PRB #00 and PRB #01 for potential Message 3 from legacy UEs and subcarriers {SC #00, SC #01, SC #02} and subcarriers {SC #03, SC #04, SC #05} for potential Message 3 from sub-PRB capable UEs. It should be appreciated that a similar mapping can be made for the 6 subcarrier case, e.g. PRB #00 maps to subcarriers {SC #00, SC #01. SC #02, SC #03, SC #04, SC #05} and PRB #01 maps to subcarriers {SC #06, SC #07, SC #08, SC #09, SC #10, SC #11}.

It should be appreciated that an implementation where the pre-determined PRB is the scheduled PRB is also feasible. That is for example in FIG. 9, if UE2 is allocated to PRB #01 then it would use subcarrier {SC #03, SC #04, SC #05} of PRB #01. Similarly UE3 being scheduled to use PRB #02 would use subcarrier {SC #06, SC #07, SC #08} of the scheduled PRB #02.

Figure 10:
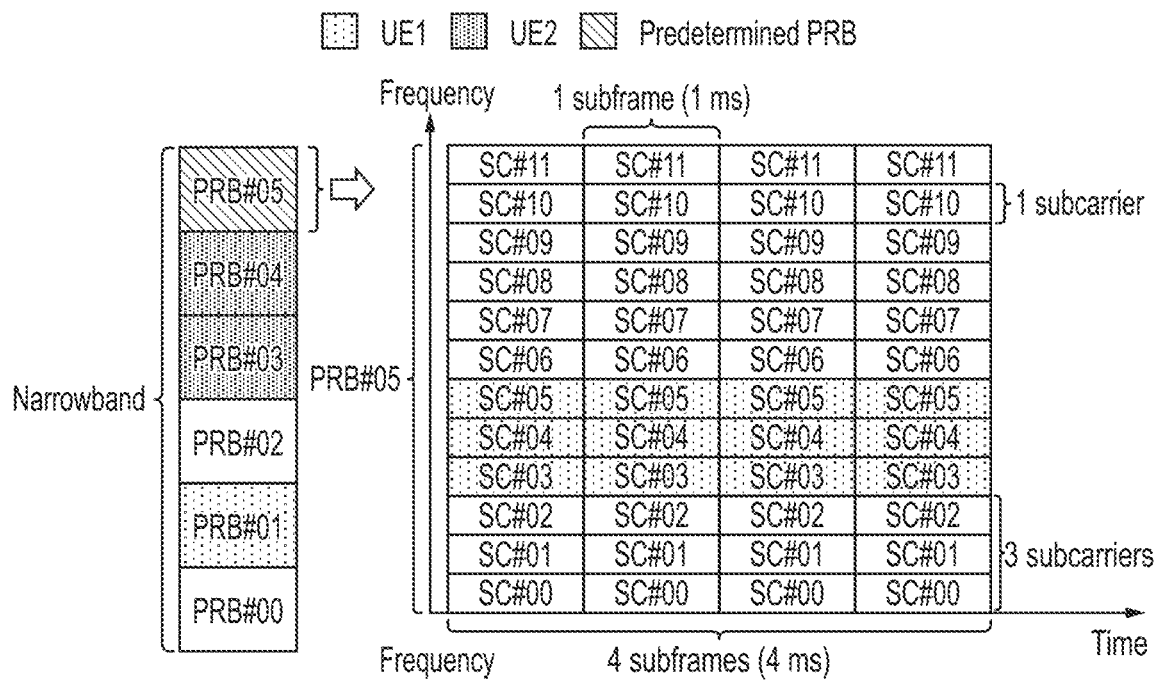
FIG. 10 shows an example of a sub-PRB capable UE being scheduled multiple PRBs in accordance with embodiments of the present technique.

It should also be noted that the UE only needs to perform the PRB to subcarrier mapping if it is scheduled to perform sub-PRB transmission, i.e. when it is scheduled with a single PRB and repetition >1 as described in Table I. Otherwise, the sub-PRB capable UE will use the scheduled PRBs directly. For example, in FIG. 10, two sub-PRB capable UEs, UE1 and UE2 are being scheduled by the eNodeB. UE1 is scheduled to use PRB #01 with 4× repetitions and UE2 is being scheduled to use PRB #03 and PRB #04 (multiple PRBs). Since UE1 is sub-PRB capable, this resource allocation would implicitly tell UE1 to use 3 subcarriers for its Message 3 transmission and to map them to subcarriers {SC #03, SC #04, SC #05} in PRB #05 (where PRB #05 is the predetermined PRB). UE2 is being allocated multiple PRBs which implicitly tells it NOT to use sub-PRB transmission for its Message 3 and would therefore directly use the allocated PRBs (PRB #03, PRB #04) for its transmission. It should be appreciated that the examples in FIG. 9 and FIG. 10 are only one way of mapping PRB to subcarriers and other mapping is possible.

In one example arrangement the PRB to subcarrier mapping is broadcast in the SIBs (e.g. whether PRB #00 maps to {SC #00, SC #01, SC #02} or it is mapped to some other set of subcarriers such as {SC #03, SC #04, SC #05} etc.).

In another example arrangement the predetermined PRB is broadcast in the SIBs (e.g. whether the predetermined PRB is PRB #05 in FIG. 6, PRB #04 or same as the scheduled PRB, etc).

In another example arrangement the predetermined PRB is specified in the specifications. A possible implementation is that this predetermined PRB is a function of the narrowband used, e.g. if Narrowband #00 is used then the predetermined PRB is PRB #00, Narrowband #01 means PRB #01 is the predetermined PRB, etc. A wrap around can be implemented e.g. if Narrowband #06 is used then the predetermined PRB is PRB #00, if Narrowband #07 is used then predetermined PRB is PRB #01.

In another example arrangement the PRB to subcarrier mapping is specified in the specifications. This can be a function of where the predetermined PRB is and/or a function of the scheduled narrowband.

Figure 11:
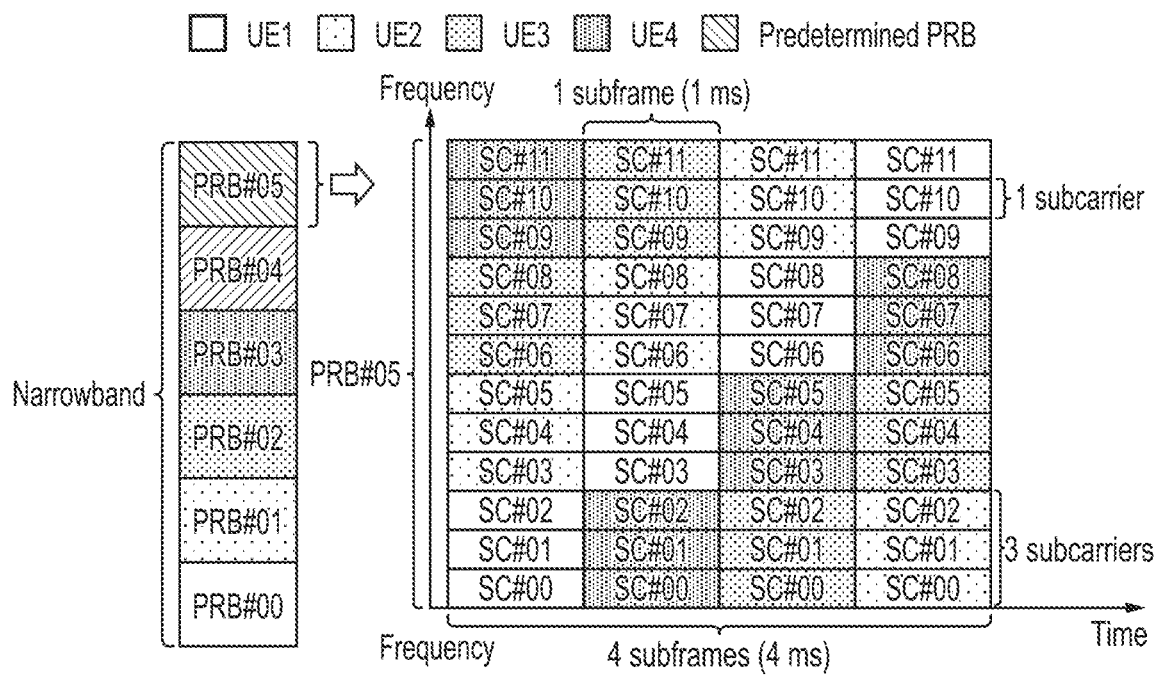
FIG. 11 shows an example of a PRB to subcarrier hopping mapping in accordance with embodiments of the present technique.

In another example arrangement the PRB to subcarrier mapping also indicates the subcarrier hopping (frequency hopping) pattern. That is instead of mapping to only one set of subcarriers, the PRB would implicitly indicate the set of subcarriers used throughout the transmission of the transport block. In other words, in this example arrangement, the characteristics of the scheduling message which indicates the subcarriers forming the second set of radio resources comprise a hopping pattern defining a mapping between the subcarriers forming the first set of radio resources and the subcarriers forming the second set of radio resources, wherein the subcarriers forming the second set of radio resources comprises a plurality of distinct sets of subcarriers. An example of PRB to subcarrier hopping pattern is shown in FIG. 11, where like in FIG. 9, four of the (six) PRBs are mapped to specific subcarriers in the predetermined PRB (PRB #05). However, unlike FIG. 9, the set of subcarriers used by the UEs are different in different subframes as shown in FIG. 11. It should be appreciated that although here the subcarriers are hopped at every subframe, this example arrangement can be applied for subcarrier hopping with a longer duration in each subcarrier, e.g. the subcarrier is hopped every 4 subframes.

Figure 12:
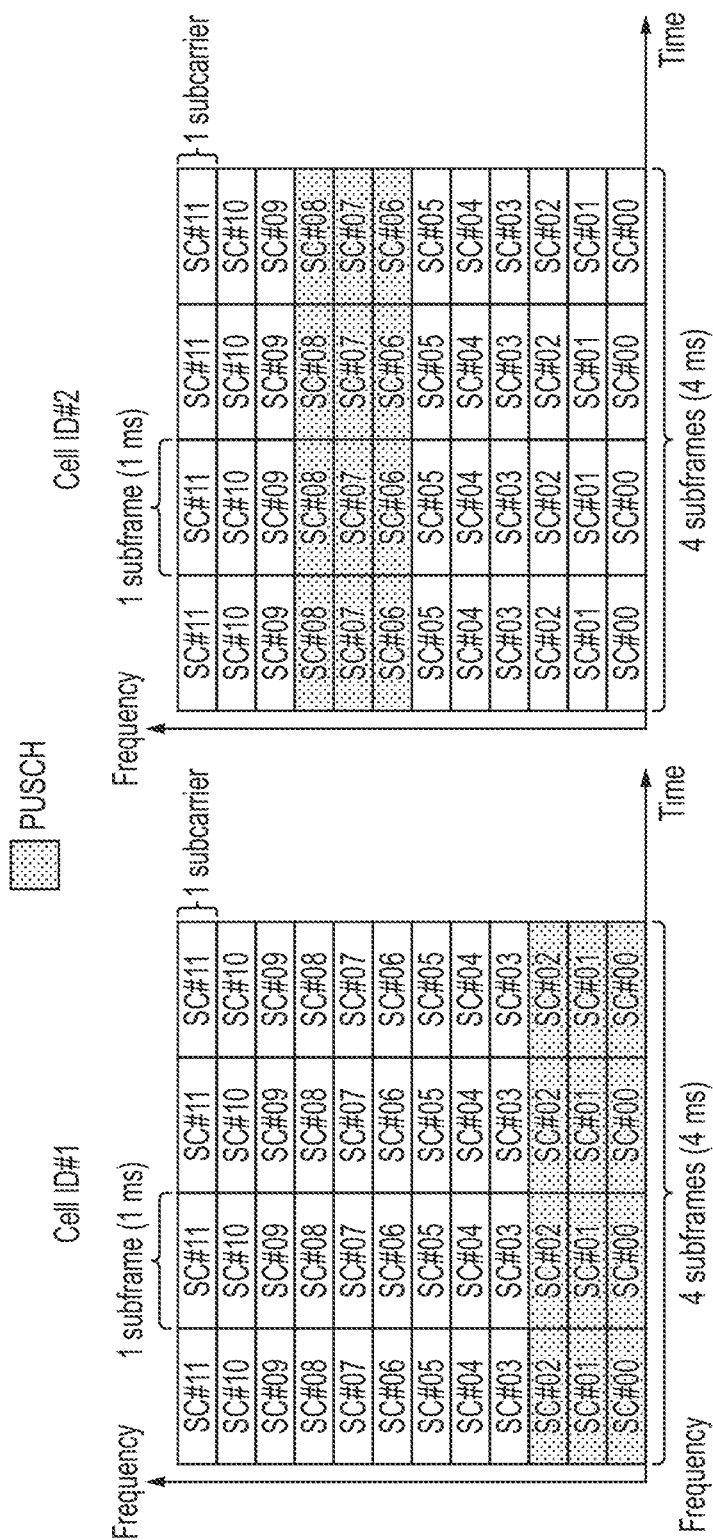
FIG. 12 shows an example of a Cell ID to subcarrier set mapping in accordance with embodiments of the present technique.

In another example arrangement, the set of subcarrier used by the UE is a function of the Cell ID of the serving cell. This allows neighbouring cells to use different sets of subcarriers for sub-PRB transmission of Message 3 thereby randomising the interference. A UE is allocated a PRB and either uses that PRB for a legacy transmission (12 subcarriers wide) or for a sub-PRB transmission, but when the UE transmits a sub-PRB PUSCH, the subcarriers used for that sub-PRB PUSCH are a function of the cell ID. For example, in FIG. 12, 3 subcarriers are allocated to a UE in two different cells, with Cell ID #1 and Cell ID #2. In Cell ID #1 the UE would use subcarrier set {SC #00, SC #01, SC #02} whenever 3 subcarriers are allocated and in Cell ID #2 the UE would use subcarrier set {SC #06, SC #07, SC #09} whenever 3 subcarriers are allocated. In other words, in this example arrangement, the characteristics of the scheduling message which indicates the subcarriers forming the second set of radio resources comprise a mapping between a cell identifier of a coverage area provided by the infrastructure equipment and the subcarriers forming the second set of radio resources.

Figure 13:
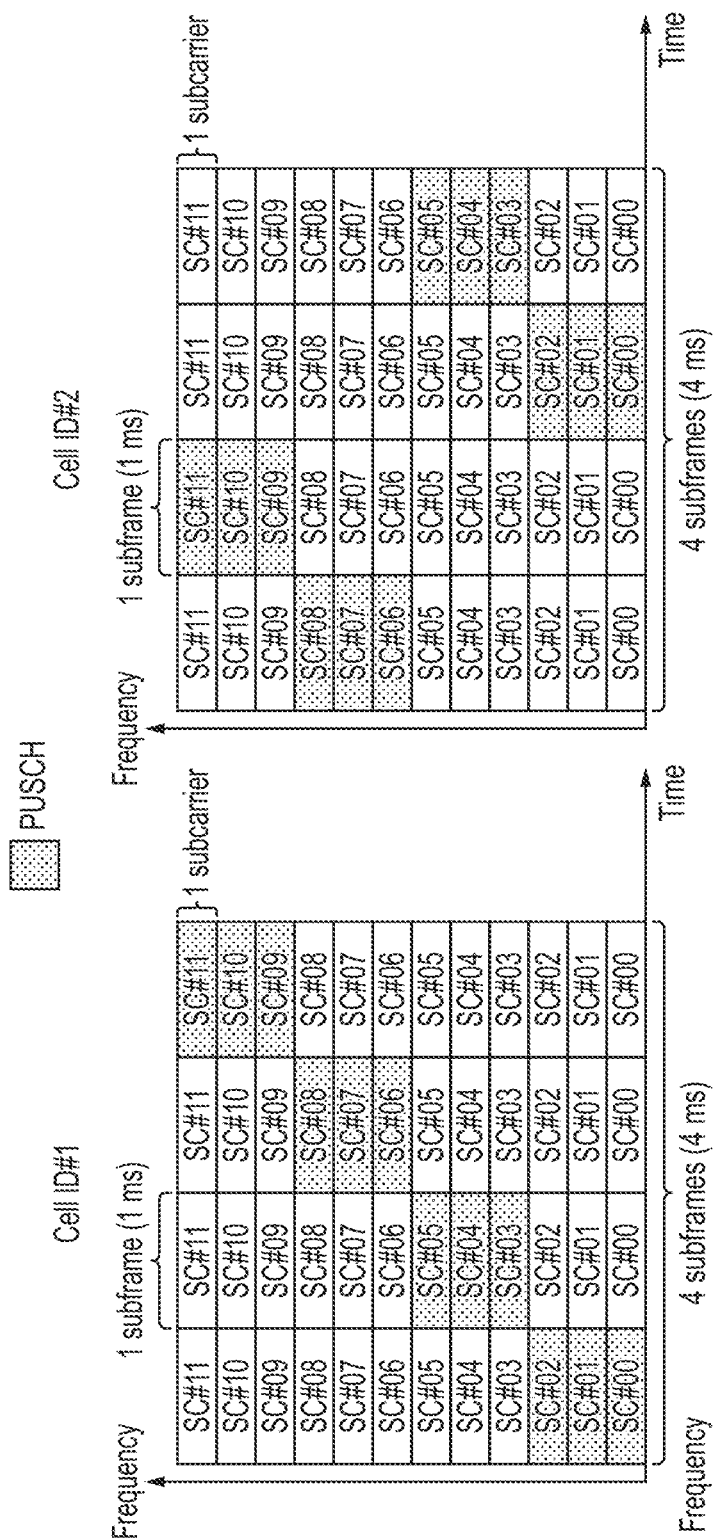
FIG. 13 shows an example of a Cell ID to subcarrier hopping pattern mapping in accordance with embodiments of the present technique.

If subcarrier hopping is used, then each Cell ID would indicate a different subcarrier hopping. In other words, in this example arrangement, the characteristics of the scheduling message which indicates the subcarriers forming the second set of radio resources comprise a hopping pattern defining a mapping between the cell identifier of the coverage area provided by the infrastructure equipment and the subcarriers forming the second set of radio resources, wherein the subcarriers forming the second set of radio resources comprises a plurality of distinct sets of subcarriers. An example is shown in FIG. 13 where the subcarrier occupied by the UE is different in different subframes and the subcarrier hopping pattern for a UE in Cell ID #1 and another in Cell ID #2 follows a different hopping sequence where the hopping sequence is a function of the serving cell ID.

In the arrangements described above relating to Cell ID, the Cell ID to subcarrier or to subcarrier hopping mapping can be specified in the specifications.

Sub-PRB Aware RACH

Some embodiments of the present technique can provide example arrangements for cases where the eNodeB is aware of whether or not a PRACH (preamble) is received from a UE that is capable of sub-PRB transmission for Message 3. In other words, in these embodiments, the infrastructure equipment is aware of whether or not the at least one communications device is capable of transmitting the random access procedure message using the second set of radio resources.

Figure 14:
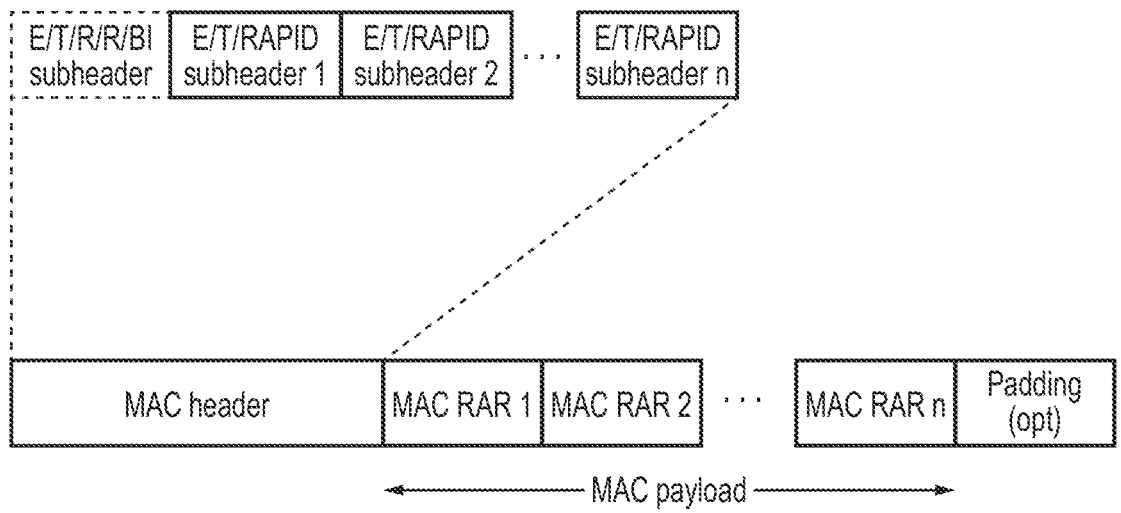
FIG. 14 shows an example of a medium access control (MAC) protocol data unit (PDU) for MAC random access responses (RARs) in accordance with embodiments of the present technique.
Figure 15:
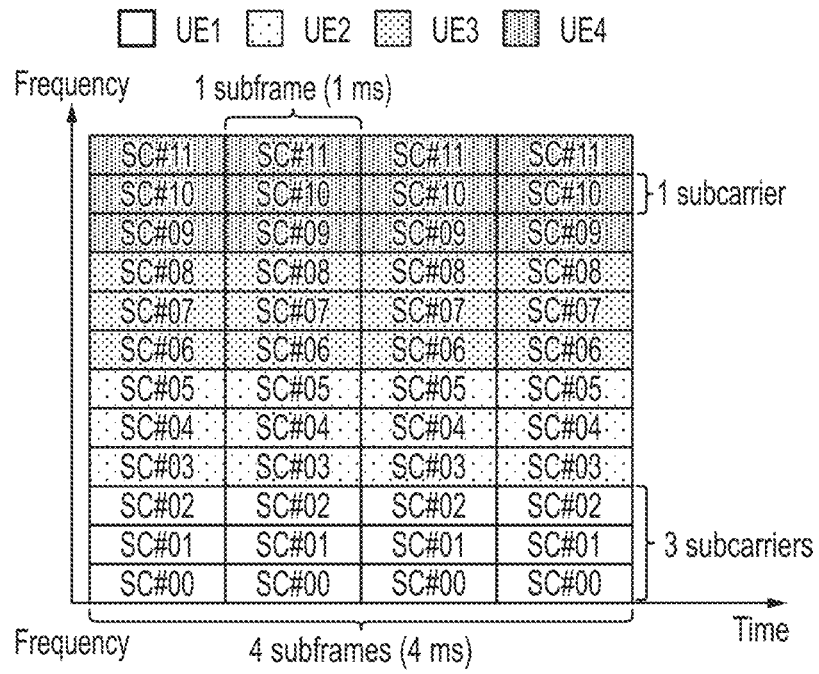
FIG. 15 shows an example of a set of subcarriers used for four different UEs with allocations of three subcarriers per subframe in accordance with embodiments of the present technique.

In an example arrangement, the set of subcarriers used by a UE is dependent upon the location of the UE's RAR within the MAC PDU (i.e. the MAC PDU that is transmitted in Msg2). This enables the eNodeB to multiplex multiple sub-PRB Message 3 transmission into a PRB thereby improving capacity. In other words, in this example arrangement, the characteristics of the scheduling message which indicates the subcarriers forming the second set of radio resources comprise a mapping between a location within the scheduling message of a portion the scheduling message which is relevant to the at least one communications device and the subcarriers forming the second set of radio resources. In the existing system, multiple RARs are multiplexed in a single MAC PDU as shown in FIG. 14 (which can be found in Section 6.1.5 of [7]), where the MAC header indicates the PRACH resources that the eNodeB is responding to and the position of the MAC header would match the position of the MAC RAR for that UE. Hence, in this example arrangement, the position of the MAC RAR would implicitly tell the UE the set of subcarriers the UE should use. An example is shown in FIG. 15, where the RAR responds to 4 different UEs (UE1, UE2, UE3, U4) and the $1^{st}$ MAC RAR position (e.g. MAC RAR1 in FIG. 14) implicitly indicates to the that UE to use subcarriers {SC #00, SC #01, SC #02}, the $2^{nd}$ MAC RAR position indicates subcarriers {SC #03, SC #04, SC #05}, the $3^{rd}$ MAC RAR position indicates subcarriers {SC #06, SC #07, SC #08} and the $4^{th}$ MAC RAR position indicates subcarriers {SC #09, SC #10, SC #11}. Hence, the eNodeB can easily multiplex these 4 UEs by assigning UE1 to MAC RAR position 1, UE2 to position 2. UE3 to position 3 and UE4 to position 4. A wraparound can be used such that the $5^{th}$ MAC RAR position indicates subcarriers {SC #00, SC #01, SC #02} again (note the eNodeB can schedule a different PRB for the $5^{th}$ UE). One way of expressing the subcarrier SC(n) within a PRB used for the $n^{th}$ subcarrier within an allocated $N_{SC}$ subcarriers (e.g. $N_{SC}$=3 or 6) as a function of the $P_{RAR}$ MAC RAR position the UE in the MAC PDU is:

$$SC(n) = \text{MOD}(n, N_{SC}) + \left(\text{MOD}\left(P_{RAR}, \frac{12}{N_{SC}}\right) \times N_{SC}\right)$$

Where, n={0, 1, . . . , $N_{SC}$−1}, SC={0, 1, 2, . . . , 11}, $P_{RAR}$={0, 1, 2, . . . }. Such a function can be specified in the specifications. It should be appreciated other functions of the MAC RAR position can be used, e.g. one can easily find another function that places the $1^{st}$ UE in the MAC RAR in subcarrier {SC #09, SC #10, SC #11} instead of {SC #00, SC #01, SC #02}.

Figure 16:
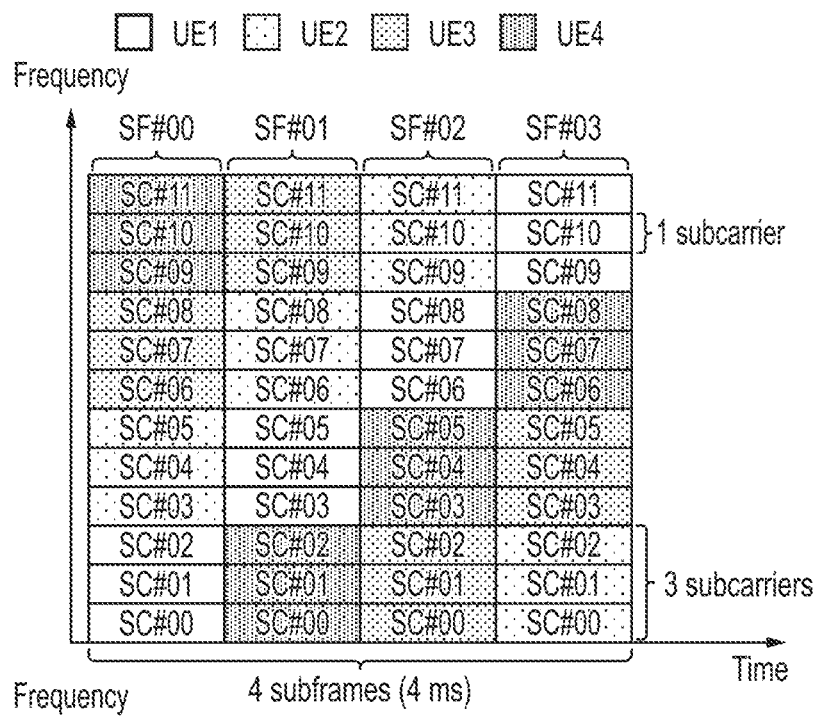
FIG. 16 shows an example of subcarrier hopping with different starting positions in accordance with embodiments of the present technique.

For the case where frequency or subcarrier hopping is used, the MAC RAR position $P_{RAR}$ would indicate the starting position and the subcarrier hopping can be a simple offset of $N_{SC}$. An example is shown in FIG. 16 where the set of subcarriers in the $1^{st}$ subframe (SF #00) follows those in FIG. 15 and in subsequent subframes, the subcarrier is offset by 3 subcarriers. In other words, the characteristics of the scheduling message which indicates the subcarriers forming the second set of radio resources comprise a hopping pattern defining a mapping between the location within the scheduling message of the portion the scheduling message which is relevant to the at least one communications device and the subcarriers forming the second set of radio resources, wherein the subcarriers forming the second set of radio resources comprises a plurality of distinct sets of subcarriers.

In another example arrangement, the set of subcarriers or the starting set of subcarriers (for subcarrier hopping) is implicitly indicated by the PRACH resource used. The PRACH resource consists of frequency, time and preamble and a combination of these would indicate the set of subcarriers used. In other words, in this example arrangement, the scheduling message is transmitted to the at least one communications device in response to receiving a physical random access channel, PRACH, signal comprising a preamble signature from the at least one communications device, and the characteristics of the scheduling message which indicates the subcarriers forming the second set of radio resources comprise a mapping between one or more of frequency resources used for the PRACH signal, time resources used for the transmission of the PRACH signal, and the preamble signature of the PRACH signal, and the subcarriers forming the second set of radio resources. When subcarrier hopping is used in this example arrangement, the characteristics of the scheduling message which indicates the subcarriers forming the second set of radio resources comprise a hopping pattern defining a mapping between one or more of the frequency resources used for the PRACH signal, the time resources used for the transmission of the PRACH signal, and the preamble signature of the PRACH signal, and the subcarriers forming the second set of radio resources, wherein the subcarriers forming the second set of radio resources comprises a plurality of distinct sets of subcarriers.

In another example arrangement, the set of subcarriers or the starting set of subcarriers is determined from the UE RA-RNTI. In other words, in this example arrangement, the characteristics of the scheduling message which indicates the subcarriers forming the second set of radio resources comprise a mapping between a random access radio network temporary identifier, RA-RNTI, of the at least one communications device and the subcarriers forming the second set of radio resources. When subcarrier hopping is used in this example arrangement, the characteristics of the scheduling message which indicates the subcarriers forming the second set of radio resources comprise a hopping pattern defining a mapping between the RA-RNTI of the at least one communications device and the subcarriers forming the second set of radio resources, wherein the subcarriers forming the second set of radio resources comprises a plurality of distinct sets of subcarriers. It should be noted that the RA-RNTI is a function of the PRACH resource and this example arrangement is basically a special case of the previous example arrangement of the set of subcarriers or the starting set of subcarriers (for subcarrier hopping) being implicitly indicated by the PRACH resource used. An example function can be, where RNTI=RA-RNTI of the UE:

$$SC(n) = \mathrm{MOD}(n, N_{SC}) + \left(\mathrm{MOD}\left(RNTI, \frac{12}{N_{SC}} \times N_{SC}\right)\right)$$

It should be appreciated that the eNodeB has less scheduling control when using the PRACH resources or RA-RNTI to determine the subcarrier locations since the eNB is unable to control the PRACH resources used by the UE.

Flow Chart Representation

Figure 17:
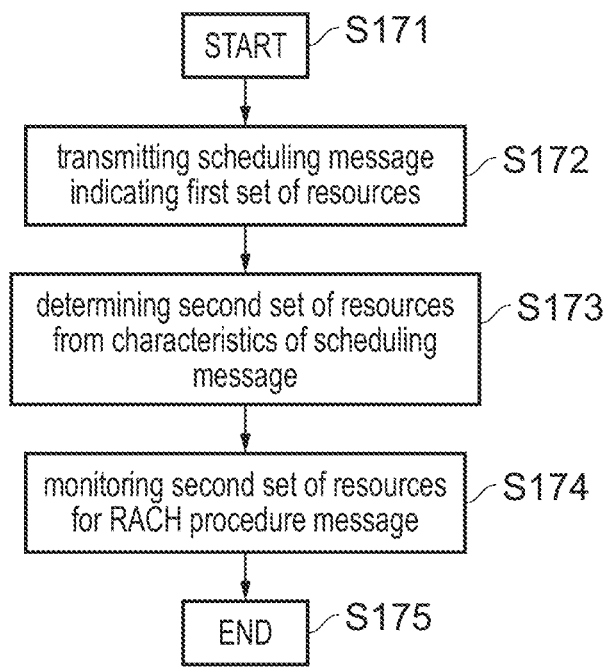
FIG. 17 shows a flow diagram illustrating a process of communication in a communications system in accordance with embodiments of the present technique.

FIG. 17 shows a flow diagram illustrating a process of communications in a communications system in accordance with embodiments of the present technique. The process shown by FIG. 17 is a method of operating an infrastructure equipment in a wireless communications system to support first and second random access procedures, wherein a number of subcarriers used for an uplink message of the second random access procedure is smaller than a number of subcarriers used for a corresponding uplink message of the first random access procedure.

The method begins in step S171. The method comprises, in step S172, transmitting, to at least one communications device, a scheduling message comprising an indication of a first set of radio resources comprising a plurality of subcarriers to be used for a random access procedure message for the first random access procedure. The process proceeds to step S173, which comprises determining a second set of radio resources to be used for a random access procedure message for the second random access procedure, wherein the second set of radio resources comprises one or more subcarriers which are indicated by one or more characteristics of the scheduling message. The process then proceeds to step S174, which comprises monitoring for a random access procedure message from the at least one communications device on the second set of radio resources. The process ends in step S175.

Those skilled in the art would appreciate that the method shown by FIG. 17 may be adapted in accordance with embodiments of the present technique. For example, other intermediate steps may be included in the method, or the steps may be performed in any logical order.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

The following numbered paragraphs provide further example aspects and features of the present technique:

Paragraph 1. A method of operating an infrastructure equipment in a wireless communications system to support first and second random access procedures, wherein a number of subcarriers used for an uplink message of the second random access procedure is smaller than a number of subcarriers used for a corresponding uplink message of the first random access procedure, and wherein the method comprises:

transmitting, to at least one communications device, a scheduling message comprising an indication of a first set of radio resources comprising a plurality of subcarriers to be used for a random access procedure message for the first random access procedure;

determining a second set of radio resources to be used for a random access procedure message for the second random access procedure, wherein the second set of radio resources comprises one or more subcarriers which are indicated by one or more characteristics of the scheduling message; and monitoring for a random access procedure message from the at least one communications device on the second set of radio resources.

Paragraph 2. A method according to Paragraph 1, wherein the infrastructure equipment monitors for the random access procedure message on both the first set of radio resources and the second set of radio resources.

Paragraph 3. A method according to Paragraph 1 or Paragraph 2, wherein the scheduling message is a random access response message, transmitted to the at least one communications device in response to receiving a physical random access channel, PRACH, signal comprising a preamble signature from the at least one communications device.

Paragraph 4. A method according to any preceding Paragraph, wherein the infrastructure equipment monitors for the random access procedure message from the at least one communications device on the second set of radio resources if the infrastructure equipment has scheduled the at least one communications device to transmit signals to the infrastructure equipment using radio resources within at least one of a set of predetermined frequency sub-bands.

Paragraph 5. A method according to any preceding Paragraph, wherein the infrastructure equipment is unaware of whether or not the at least one communications device is capable of transmitting the random access procedure message using the second set of radio resources.

Paragraph 6. A method according to Paragraph 5, wherein the characteristics of the scheduling message which indicates the subcarriers forming the second set of radio resources comprise a mapping between the subcarriers forming the first set of radio resources and the subcarriers forming the second set of radio resources.

Paragraph 7. A method according to Paragraph 6, wherein the second set of radio resources is selected from a predetermined set of radio resources.

Paragraph 8. A method according to Paragraph 5 or Paragraph 6, wherein the characteristics of the scheduling message which indicates the subcarriers forming the second set of radio resources comprise a hopping pattern defining a mapping between the subcarriers forming the first set of radio resources and the subcarriers forming the second set of radio resources, wherein the subcarriers forming the second set of radio resources comprises a plurality of distinct sets of subcarriers.

Paragraph 9. A method according to any of Paragraphs 5 to 8, wherein the characteristics of the scheduling message which indicates the subcarriers forming the second set of radio resources comprise a mapping between a cell identifier of a coverage area provided by the infrastructure equipment and the subcarriers forming the second set of radio resources.

Paragraph 10. A method according to Paragraph 9, wherein the characteristics of the scheduling message which indicates the subcarriers forming the second set of radio resources comprise a hopping pattern defining a mapping between the cell identifier of the coverage area provided by the infrastructure equipment and the subcarriers forming the second set of radio resources, wherein the subcarriers forming the second set of radio resources comprises a plurality of distinct sets of subcarriers.

Paragraph 11. A method according to any preceding Paragraph, wherein the infrastructure equipment is aware of whether or not the at least one communications device is capable of transmitting the random access procedure message using the second set of radio resources.

Paragraph 12. A method according to Paragraph 11, wherein the characteristics of the scheduling message which indicates the subcarriers forming the second set of radio resources comprise a mapping between a location within the scheduling message of a portion the scheduling message which is relevant to the at least one communications device and the subcarriers forming the second set of radio resources.

Paragraph 13. A method according to Paragraph 11 or Paragraph 12, wherein the characteristics of the scheduling message which indicates the subcarriers forming the second set of radio resources comprise a hopping pattern defining a mapping between the location within the scheduling message of the portion the scheduling message which is relevant to the at least one communications device and the subcarriers forming the second set of radio resources, wherein the subcarriers forming the second set of radio resources comprises a plurality of distinct sets of subcarriers.

Paragraph 14. A method according to any of Paragraphs 11 to 13, wherein the scheduling message is transmitted to the at least one communications device in response to receiving a physical random access channel, PRACH, signal comprising a preamble signature from the at least one communications device, and the characteristics of the scheduling message which indicates the subcarriers forming the second set of radio resources comprise a mapping between one or more of frequency resources used for the PRACH signal, time resources used for the transmission of the PRACH signal, and the preamble signature of the PRACH signal, and the subcarriers forming the second set of radio resources.

Paragraph 15. A method according to Paragraph 14, wherein the characteristics of the scheduling message which indicates the subcarriers forming the second set of radio resources comprise a hopping pattern defining a mapping between one or more of the frequency resources used for the PRACH signal, the time resources used for the transmission of the PRACH signal, and the preamble signature of the PRACH signal, and the subcarriers forming the second set of radio resources, wherein the subcarriers forming the second set of radio resources comprises a plurality of distinct sets of subcarriers.

Paragraph 16. A method according to any of Paragraphs 11 to 15, wherein the characteristics of the scheduling message which indicates the subcarriers forming the second set of radio resources comprise a mapping between a random access radio network temporary identifier, RA-RNTI, of the at least one communications device and the subcarriers forming the second set of radio resources.

Paragraph 17. A method according to Paragraph 16, wherein the characteristics of the scheduling message which indicates the subcarriers forming the second set of radio resources comprise a hopping pattern defining a mapping between the RA-RNTI of the at least one communications device and the subcarriers forming the second set of radio resources, wherein the subcarriers forming the second set of radio resources comprises a plurality of distinct sets of subcarriers.

Paragraph 18. An infrastructure equipment for use in a wireless communications system to support first and second random access procedures, wherein a number of subcarriers used for an uplink message of the second random access procedure is smaller than a number of subcarriers used for a corresponding uplink message of the first random access procedure, and wherein the infrastructure equipment comprises controller circuitry and transceiver circuitry configured in combination:
    to transmit, to at least one communications device, a scheduling message comprising an indication of a first set of radio resources comprising a plurality of subcarriers to be used for a random access procedure message for the first random access procedure;

to determine a second set of radio resources to be used for a random access procedure message for the second random access procedure, wherein the second set of radio resources comprises one or more subcarriers which are indicated by one or more characteristics of the scheduling message; and to monitor for a random access procedure message from the at least one communications device on the second set of radio resources.

Paragraph 19. Circuitry for an infrastructure equipment for use in a wireless communications system to support first and second random access procedures, wherein a number of subcarriers used for an uplink message of the second random access procedure is smaller than a number of subcarriers used for a corresponding uplink message of the first random access procedure, and wherein the infrastructure equipment comprises controller circuitry and transceiver circuitry configured in combination:

to transmit, to at least one communications device, a scheduling message comprising an indication of a first set of radio resources comprising a plurality of subcarriers to be used for a random access procedure message for the first random access procedure;

to determine a second set of radio resources to be used for a random access procedure message for the second random access procedure, wherein the second set of radio resources comprises one or more subcarriers which are indicated by one or more characteristics of the scheduling message; and to monitor for a random access procedure message from the at least one communications device on the second set of radio resources.

Paragraph 20. A method of operating a communications device in a wireless communications system that supports first and second random access procedures, wherein a number of subcarriers used for an uplink message of the second random access procedure is smaller than a number of subcarriers used for a corresponding uplink message of the first random access procedure, and wherein the method comprises:

receiving, from an infrastructure equipment of the wireless communications system, a scheduling message comprising an indication of a first set of radio resources comprising a plurality of subcarriers to be used for a random access procedure message for the first random access procedure;

determining a second set of radio resources to be used for a random access procedure message for the second random access procedure, wherein the second set of radio resources comprises one or more subcarriers which are indicated by one or more characteristics of the scheduling message; and transmitting a random access procedure message to the infrastructure equipment using the second set of radio resources.

Paragraph 21. A communications device for use in a wireless communications system that supports first and second random access procedures, wherein a number of subcarriers used for an uplink message of the second random access procedure is smaller than a number of subcarriers used for a corresponding uplink message of the first random access procedure, and wherein the communications device comprises controller circuitry and transceiver circuitry configured in combination:

to receive, from an infrastructure equipment of the wireless communications system, a scheduling message comprising an indication of a first set of radio resources comprising a plurality of subcarriers to be used for a random access procedure message for the first random access procedure;

to determine a second set of radio resources to be used for a random access procedure message for the second random access procedure, wherein the second set of radio resources comprises one or more subcarriers which are indicated by one or more characteristics of the scheduling message; and to transmit a random access procedure message to the infrastructure equipment using the second set of radio resources.

Paragraph 22. Circuitry for a communications device for use in a wireless communications system that supports first and second random access procedures, wherein a number of subcarriers used for an uplink message of the second random access procedure is smaller than a number of subcarriers used for a corresponding uplink message of the first random access procedure, and wherein the communications device comprises controller circuitry and transceiver circuitry configured in combination:

to receive, from an infrastructure equipment of the wireless communications system, a scheduling message comprising an indication of a first set of radio resources comprising a plurality of subcarriers to be used for a random access procedure message for the first random access procedure;

to determine a second set of radio resources to be used for a random access procedure message for the second random access procedure, wherein the second set of radio resources comprises one or more subcarriers which are indicated by one or more characteristics of the scheduling message; and to transmit a random access procedure message to the infrastructure equipment using the second set of radio resources.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464. "Revised WID for Further Enhanced MTC for LTE," Ericsson, 3GPP TSG RAN Meeting #73, New Orleans, USA, Sep. 19-22, 2016.

[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75. Dubrovnik. Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] R1-1717762, "Sub-PRB Design Analysis," Sierra Wireless, RAN1 #90bis.
[7] TS36.321. "Medium Access Control (MAC) protocol specification (Release 14)" v14.0.0.

What is claimed is:

1. Circuitry for an infrastructure equipment for use in a wireless communications system to support first and second random access procedures, wherein a first number of subcarriers used for an uplink message of the second random access procedure is different than a second number of subcarriers used for a corresponding uplink message of the first random access procedure, and wherein the circuitry is configured to:
transmit, to at least one communications device, a scheduling message comprising an indication of a first set of radio resources to be used for a random access procedure message for the first random access procedure, wherein one or more characteristics of the scheduling message indicate a second set of radio resources to be used for a random access procedure message for the second random access procedure; and
monitor for a random access procedure message from the at least one communications device on the second set of radio resources,
wherein the scheduling message is a random access response message, transmitted to the at least one communications device in response to receiving a physical random access channel (PRACH) signal comprising a preamble signature from the at least one communications device.

2. The circuitry of claim 1, wherein
the circuitry is configured to monitors for the random access procedure message on both the first set of radio resources and the second set of radio resources.

3. The circuitry of claim 1, wherein
the circuitry is configured to monitor for the random access procedure message from the at least one communications device on the second set of radio resources if the infrastructure equipment has scheduled the at least one communications device to transmit signals to the infrastructure equipment using radio resources within at least one of a set of predetermined frequency sub-bands.

4. The circuitry of claim 1, wherein
the infrastructure equipment is unaware of whether or not the at least one communications device is capable of transmitting the random access procedure message using the second set of radio resources.

5. The circuitry of claim 4, wherein
the characteristics of the scheduling message which indicates subcarriers forming the second set of radio resources comprise a mapping between subcarriers forming the first set of radio resources and subcarriers forming the second set of radio resources.

6. The circuitry of claim 5, wherein
the second set of radio resources is selected from a predetermined set of radio resources.

7. The circuitry of claim 5, wherein
the characteristics of the scheduling message which indicates subcarriers firming the second set of radio resources comprise a hopping pattern defining a mapping between subcarriers forming the first set of radio resources and the sub carriers forming the second set of radio resources.

8. The circuitry of claim 7, wherein
the subcarriers forming the second set of radio resources comprises a plurality of distinct sets of subcarriers.

9. The circuitry of claim 4, wherein
the characteristics of the scheduling message which indicates subcarriers forming the second set of radio resources comprise a mapping between a cell identifier of a coverage area provided by the infrastructure equipment and subcarriers forming the second set of radio resources.

10. The circuitry of claim 9, wherein
the characteristics of the scheduling message which indicates the subcarriers forming the second set of radio resources comprise a hopping pattern defining a mapping between the cell identifier of the coverage area provided by the infrastructure equipment and the subcarriers forming the second set of radio resources, and
the subcarriers forming the second set of radio resources comprises a plurality of distinct sets of subcarriers.

11. The circuitry of claim 1, wherein
the infrastructure equipment is aware of whether or not the at least one communications device is capable of transmitting the random access procedure message using the second set of radio resources.

12. The circuitry of claim 11, wherein
the characteristics of the scheduling message which indicates subcarriers forming the second set of radio resources comprise a mapping between a location within the scheduling message of a portion the scheduling message which is relevant to the at least one communications device and the subcarriers forming the second set of radio resources.

13. The circuitry of claim 12, wherein
the characteristics of the scheduling message which indicates the subcarriers forming the second set of radio resources comprise a hopping pattern defining a mapping between the location within the scheduling message of the portion the scheduling message which is relevant to the at least one communications device and the subcarriers forming the second set of radio resources, wherein the subcarriers forming the second set of radio resources comprises a plurality of distinct sets of subcarriers.

14. The circuitry of claim 11, wherein
the scheduling message is transmitted to the at least one communications device in response to receiving a physical random access channel (PRACH) signal comprising a preamble signature from the at least one communications device, and
the characteristics of the scheduling message which indicates subcarriers forming the second set of radio resources comprise a mapping between one or more of frequency resources used for the PRACH signal, time resources used for the transmission of the PRACH signal, and the preamble signature of the PRACH signal, and the subcarriers forming the second set of radio resources.

15. The circuitry of claim 14, wherein
the characteristics of the scheduling message which indicates the subcarriers forming the second set of radio resources comprise a hopping pattern defining the mapping between one or more of the frequency resources used for the PRACH signal, the time resources used for the transmission of the PRACH signal, and the preamble signature of the PRACH signal, and the subcarriers forming the second set of radio resources, and
the subcarriers forming the second set of radio resources comprises a plurality of distinct sets of subcarriers.

16. The circuitry of claim 11, wherein
the characteristics of the scheduling message which indicates subcarriers forming the second set of radio resources comprise a mapping between a random access radio network temporary identifier (RA-RNTI) of the at least one communications device and the subcarriers forming the second set of radio resources.

17. The circuitry of claim 16, wherein
the characteristics of the scheduling message which indicates the subcarriers forming the second set of radio resources comprise a hopping pattern defining the mapping between the RA-RNTI of the at least one communications device and the subcarriers forming the second set of radio resources, and
the subcarriers forming the second set of radio resources comprises a plurality of distinct sets of subcarriers.

18. A method of operating a communications device in a wireless communications system that supports first and second random access procedures, wherein a number of subcarriers used for an uplink message of the second random access procedure is different than a number of subcarriers used for a corresponding uplink message of the first random access procedure, and wherein the method comprises:
receiving, from an infrastructure equipment of the wireless communications system, a scheduling message comprising an indication of a first set of radio resources to be used for a random access procedure message for the first random access procedure;
determining a second set of radio resources to be used for a random access procedure message for the second random access procedure, wherein the second set of radio resources are indicated by one or more characteristics of the scheduling message; and
transmitting a random access procedure message to the infrastructure equipment using the second set of radio resources,
wherein the scheduling message is a random access response message received by the communications device in response to transmitting a physical random access channel (PRACH) signal comprising a preamble signature from the communications device.

19. Circuitry for a communications device for use in a wireless communications system that supports first and second random access procedures, wherein a number of subcarriers used for an uplink message of the second random access procedure is different than a umber of subcarriers used for a corresponding uplink message of the first random access procedure, and wherein the circuitry is configured to:
receive; from an infrastructure equipment of the wireless communications system, a scheduling message comprising an indication of a first set of radio resources to be used for a random access procedure message for the first random access procedure;
determine a second set of radio resources to be used for a random access procedure message for the second random access procedure, wherein the second set of radio resources are indicated by one or more characteristics of the scheduling message; and
transmit a random access procedure message to the infrastructure equipment using the second set of radio resources,
wherein the scheduling message is a random access response message received by the communications device in response to transmitting a physical random access channel (PRACH) signal comprising a preamble signature from the communications device.

* * * * *